No. 740,664. PATENTED OCT. 6, 1903.
C. W. F. KROLL.
HOSE COUPLING.
APPLICATION FILED APR. 4, 1903.
NO MODEL.
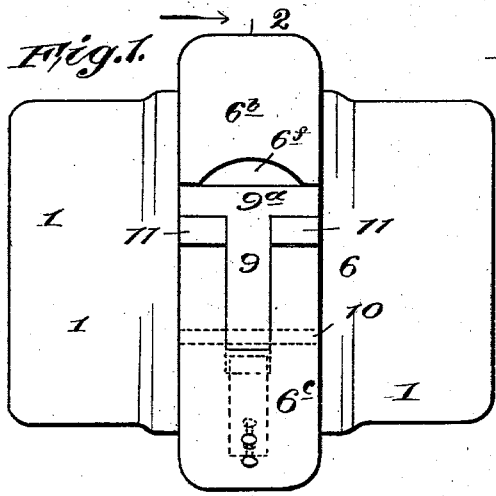
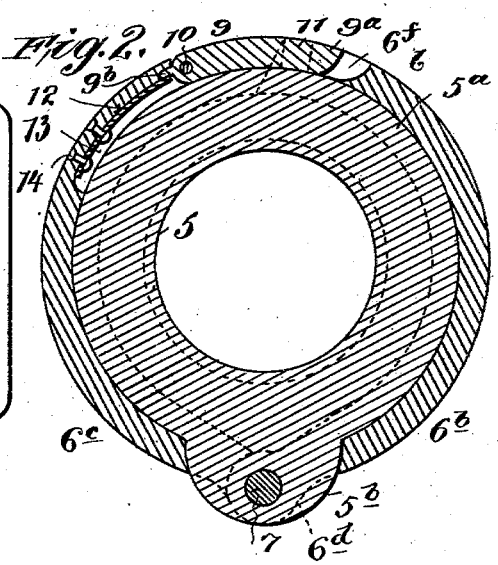
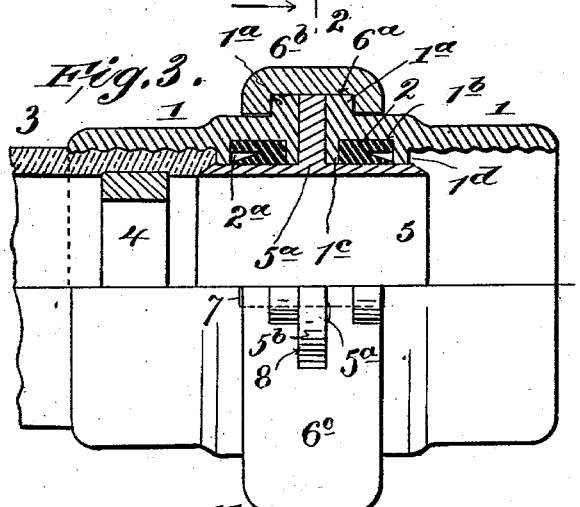
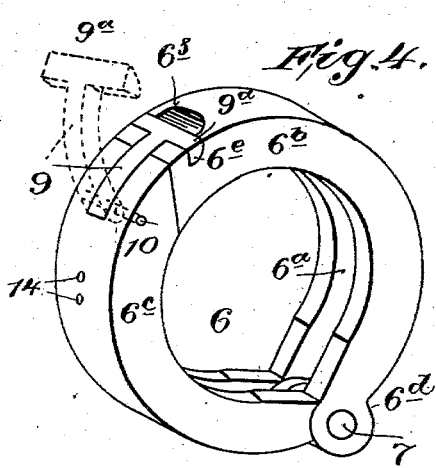
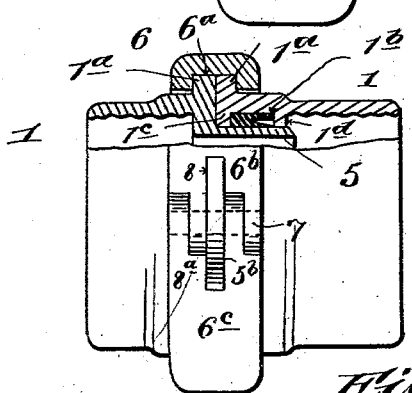
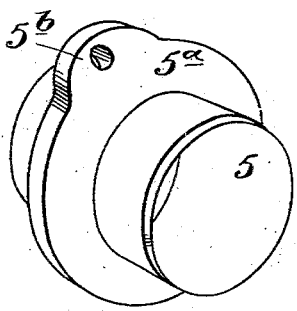
Witnesses
C. W. Benjamin
J. E. McKigney
Inventor
Chas. W. F. Kroll.
By his Attorney
G. F. Bourne No. 740,664. Patented October 6, 1903.

UNITED STATES PATENT OFFICE.

CHARLES WM. FRED KROLL, OF JERSEY CITY, NEW JERSEY.

HOSE-COUPLING.

SPECIFICATION forming part of Letters Patent No. 740,664, dated October 6, 1903.

Application filed April 4, 1903. Serial No. 151,025. (No model.)

*To all whom it may concern:*

Be it known that I, CHARLES WM. FRED KROLL, a citizen of the United States, and a resident of Jersey City, Hudson county, New Jersey, have invented certain new and useful Improvements in Hose-Couplings, of which the following is a specification.

The object of the invention is to provide a coupling whereby the ends of hose lengths can be quickly connected or separated and wherein the parts will be simple to manipulate, strong and durable, and efficient in use.

To these ends the invention comprises the novel details and arrangements of parts hereinafter explained and then pointed out in the claims.

Reference is to be had to the accompanying drawings, forming part hereof, wherein—

Figure 1 is a side view of a hose-coupling embodying my invention. Fig. 2 is a cross-section on the line 2 2 in Fig. 1. Fig. 3 is a partly-sectional side view looking from the under side in Fig. 2. Fig. 4 is a perspective view of a clamp for holding the parts together. Fig. 5 is a perspective view of a flanged sleeve or tube used in the coupling, and Fig. 6 is a partly-sectional side view of a modification.

Similar numerals of reference indicate corresponding parts in the several views.

In the drawings the numeral 1 indicates a hub or sleeve provided with an end flange $1^a$, and said hub has an internal annular groove or seat $1^b$ to receive a packing-ring or gasket 2, said seat being shown formed between internal flanges $1^c$ and $1^d$. The hub or sleeve 1 is adapted to be attached to the end of a hose 3 by any suitable means. As shown in Fig. 3, the end of the hose enters the hub and is secured therein by an expansible ring 4 in well-known manner. At 5 is indicated a sleeve or tube adapted to fit within the hub 1 and shown bearing against the corresponding flanges $1^c$ $1^d$, the ends of the sleeve being shown tapered to permit ready insertion within the hub. The sleeve or tube 5 incloses the recess or seat $1^b$ in the hub, and the packing or gasket 2 is shown fitting against the sleeve. The gasket 2 is shown provided with a groove or recess $2^a$ in its side wall, whereby when water leaks into said groove the gasket will be forced tightly to its seat by the water-pressure to make a tight fit all around in the nature of a hydraulic seal. The sleeve 5 is provided with an annular external flange $5^a$, against which the ends of two hubs 1 are adapted to abut when sleeve 5 is located between said hubs. (See Fig. 3.)

At 6 is indicated a clamp of annular form provided with an internal groove $6^a$, adapted to cover and inclose the flanges $1^a$ and $5^a$ of the hubs 1 and sleeve 5, respectively. (See Fig. 3.) The clamp is shown in the form of partially-circular members $6^b$ $6^c$, pivotally connected together, as at $6^d$, by a pin 7. Said members are shown forked at their meeting ends to form a hinged joint and provided with alined slots, (indicated at 8,) that receive the projecting portion $5^b$ of flange $5^a$, through which the pin 7 passes, whereby the clamp is pivotally carried by sleeve 5, so as to open and close about the same. To detachably hold the free ends of the members $6^b$ $6^c$ of the clamp together, I have provided a latch 9, shown pivotally supported upon member $6^c$, as at 10, and provided with a head $9^a$, having lugs or wings adapted to engage lugs 11 at the adjacent end of the member $6^b$, a space being formed between said lugs to receive the latch 9, (see Fig. 1,) the member $6^b$ being recessed at $6^e$ to receive the head of the latch. At $6^f$ is indicated a socket in the member $6^b$ to admit a finger or tool to release the latch. The latch is shown held closed by means of a spring 12, located in a recess 13 in member $6^c$ and shown riveted to said member at 14, the spring bearing against the toe $9^b$ on latch 9 and tending normally to keep the latch closed. When the clamp 6 and its latch are in the positions shown in Fig. 4, the clamp will be held firmly closed.

In using the coupling the clamp 6 is thrown open and its sleeve 5 is passed into one hub 1, and then the adjacent hub is slipped over the sleeve, the flanges $1^a$ of the hubs being brought against the flange $5^a$ of the sleeve, and the clamp is then closed upon and around the flanges and locked by the latch, and as said flanges are held within the recess $6^a$ between the side walls of the clamp it will be seen that the parts are all firmly locked together and endwise movement of the hubs and sleeve is prevented. To release the parts, it is merely necessary to throw open the clamp.

By having the clamp pivotally attached to the sleeve 5 the clamp and sleeve are maintained permanently in operative relation, so that when the sleeve is pushed into the hub to the proper position the clamp will simultaneously be brought into proper alinement with the flange of the hub. By such means the assembling of the parts of the coupling may be quickly effected and adjustment of the parts readily accomplished.

As shown in Fig. 3, the sleeve 5 when within the hubs is adapted to form a continuation of the bore in the adjacent hose lengths, as the sleeve may bear at its end against the hose and provide a free passage for water or other fluid.

In the modification shown in Fig. 6 the sleeve 5 is shown secured to one of the hubs 1, as by being made integral therewith, and the projection 5$^b$ on the flange 1$^a$ corresponding to the projection 5$^b$ of flange 5$^a$ is provided, to which the clamp 6 is pivotally attached in the manner before explained, the latch 9 also being used as explained. In this case but one gasket 2 need be used, and the clamp 6 will encircle the flanges 1$^a$ of the two hubs 1 to keep all the parts fastened together. Therefore in this case the hub 6, its sleeve 5, and the clamp 6 are all united together, whereby it is merely necessary to throw open the clamp, pass a hub over the sleeve 5, and close the clamp.

Other means than the latch 9 may be used for securing the members of the clamp 6 in closed position, and other changes in the details of construction and the relative arrangements of the parts may be made without departing from the spirit of my invention.

Having now described my invention, what I claim is—

1. A coupling of the character described comprising a pair of hubs provided with flanges, a sleeve adapted to enter a hub, a clamp carried by said sleeve adapted to inclose said hubs, and means to hold the clamp closed, substantially as described.

2. A hose-coupling comprising a pair of hubs, a sleeve adapted to enter said hubs and provided with a flange to pass between said hubs, a clamp carried by said sleeve adapted to encircle said hubs and flange, means to prevent the hubs from pulling apart when the clamp is closed, and means for holding the clamp closed, substantially as described.

3. A hose-coupling comprising a pair of hubs provided with flanges, a sleeve adapted to enter the hubs and provided with a flange adapted to lie between the hubs, a clamp pivotally carried by said sleeve adapted to encircle said flanges and having webs to engage the flanges of the hubs, and means to hold the clamp closed, combined with hose entering the hubs on opposite sides of the sleeve, and expansible rings within the hose securing the latter to the hubs, substantially as described.

4. A hose-coupling comprising a pair of hubs provided with internal flanges forming an internal seat, gaskets within said seats, a sleeve adapted to enter said hubs, a clamp pivotally carried by said sleeve to inclose said hubs, and means for holding the clamp closed, substantially as described.

5. A hose-coupling comprising a pair of hubs provided with internal flanges forming a seat, gaskets in said seat, a sleeve adapted to enter said hubs and pass within the gaskets, a clamp pivotally carried by said sleeve adapted to inclose said hubs, and means for holding the clamp closed combined with hose entering the hubs on opposite sides of the sleeve, and expansible rings within the hose securing the latter to the hubs, substantially as described.

6. A hose-coupling comprising a pair of hubs provided with flanges, a sleeve adapted to enter the hubs and provided with a flange to lie between the flanges of the hubs, a clamp pivotally supported by the flange of the sleeve adapted to inclose the flange of the hubs, and means to hold the clamp closed, substantially as described.

7. A hose-coupling comprising a pair of hubs provided with flanges, a sleeve adapted to enter the hubs and provided with a flange to lie between the hubs, a clamp comprising two members pivotally connected with the flange of the sleeve and having internal grooves to receive the flanges of the hubs and sleeve, and means to keep the clamp closed around the hubs, substantially as described.

8. A hose-coupling comprising a pair of hubs having flanges, a sleeve to enter a hub, a clamp comprising two members to receive said hubs and pivotally connected with said sleeve, and a latch connected with one member and adapted to engage the other member to hold the clamp closed around said hubs, substantially as described.

CHAS. WM. FRED KROLL.

Witnesses:
JNO. ROBT. TAYLOR,
T. F. BOURNE.